United States Patent [19]

Zaro

[11] Patent Number: 5,803,126
[45] Date of Patent: Sep. 8, 1998

[54] PROTECTIVE CLOSURE

[76] Inventor: Marvin Zaro, 405 E. 63rd St., New York, N.Y. 10021

[21] Appl. No.: 831,382

[22] Filed: Apr. 1, 1997

[51] Int. Cl.[6] ..................................................... F16L 55/11
[52] U.S. Cl. ........................... 138/89; 138/96 R; 215/296; 215/298
[58] Field of Search ............... 138/89, 90, 96 R; 215/295, 296, 297, 298, 301, 302, 303; 4/295

[56] References Cited

U.S. PATENT DOCUMENTS

| 684,799 | 10/1901 | Devoe | 215/302 |
|---|---|---|---|
| 2,479,862 | 8/1949 | Payne | 4/295 |
| 3,038,631 | 6/1962 | Calder | 138/89 |
| 4,194,494 | 3/1980 | Wagner | 138/89 |
| 4,384,653 | 5/1983 | Connor et al. | 215/303 |
| 4,815,783 | 3/1989 | Montreuil et al. | 215/302 |
| 4,823,411 | 4/1989 | Nettel | 138/89 |
| 4,964,438 | 10/1990 | Welty | 138/89 |

*Primary Examiner*—Denise L. Ferensic
*Assistant Examiner*—James F. Hook
*Attorney, Agent, or Firm*—Charles I. Brodsky

[57] ABSTRACT

A protective closure including: a closed-cell foam plastic plug of a first density, for resilience and flexibility in insertion into a water pipe for shipping and storage, and in removal therefrom for installation; and a cap of a second, higher density for limiting the extent of the insertion of the plug into the pipe; with the cap including a scooped-out handle or similar grasping construction for pulling on the cap to remove the plug from the pipe.

17 Claims, 2 Drawing Sheets

PROTECTIVE CLOSURE

FIELD OF THE INVENTION

This invention relates to the field of public health and, more particularly, to water distribution systems, both for residential and commercial users.

BACKGROUND OF THE INVENTION

As is well known and understood, water pipes transported to a construction development site are typically dumped along the road, and allowed to lie there for some time until their subsequent installation. As is also well known and understood, such pipes are similarly stacked, lying on the ground, at the warehouse, storage area, and loading dock at the manufacturing facility until such time as they are loaded onto the freight cars or trucks, for delivery to the location of the construction project. As will be appreciated, during all this time and until actual installation, the water pipes remain open—attractive to rats and other rodents, for example, and susceptible to the collection of mud and other debris. A focus on public health makes it evident that this is a situation to be avoided, with a need for some type of protective closure to seal off both the bell end and spigot end of the pipes until installation.

OBJECTS OF THE INVENTION

It is an object of the present invention, therefore, to provide such a protective closure.

It is another object of the invention to provide such a protective closure that is highly water tight and dirt and debris proof.

It is an additional object of the invention to provide a protective closure that can fit both the bell end and spigot end of a water pipe, although they be of different inside diameters.

It is also an object of the invention to provide such a closure which will be retained in place by friction, yet which can be easily removed by hand.

It is yet another object of the invention to provide a protective closure of this type, which is not affected by extreme variations in temperature, in going from hot to cold and vice versa.

It is an additional object of the invention to provide this kind of protective closure in a manner that limits its insertion into the water pipe, to thus make removal easier when it is time for the pipe installation to be made.

It is yet a further object of the invention, to provide a protective closure of this nature which is waterproof, flexible, easily insertible into the water pipe and easily removable therefrom.

It is a further object of the invention, obviously, to provide such a protective closure which can be easily and inexpensively manufactured.

SUMMARY OF THE INVENTION

These and further objects of the invention will be seen to be attained by the use of a protective closure including a plastic plug of a first density, for resilience and flexibility in insertion into the water pipe for shipping and storage, and in removal for installation. As will be seen, the protective enclosure also incorporates a cap of a higher density, for limiting the extent of the insertion of the plug into the pipe. To facilitate the removal of the plug from the pipe, the cap end will be seen to include a scooped handle or similar construction for ease of pulling.

In a preferred embodiment to be described, both the plug and cap of the enclosure are composed of a closed-cell polyethylene foam—although in an alternative embodiment, a hard sheet plastic may be utilized instead for the cap. In such preferred embodiment, the plug will be seen to have a diameter slightly greater than the inside diameter of the water pipe, while the cap is of even greater diameter. In such a configuration, the density of the closed-cell foam plastic plug permits a squishing or squashing of the protective closure inside the water pipe, to be held in place thereby by friction, while the higher density of the cap serves as a limiter to insertion of the entire protective closure further into the pipe itself.

BRIEF DESCRIPTION OF THE DRAWINGS

These and other features of the present invention will be more clearly understood from a consideration of the following drawing in which.

DETAILED DESCRIPTION OF THE DRAWINGS

Figure 1:
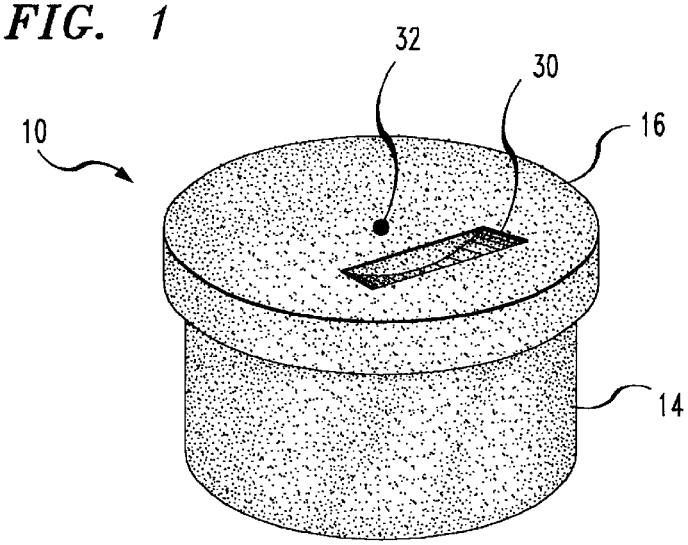
FIG. 1 is a perspective view of a protective closure constructed in accordance with a preferred embodiment of the invention.

In the drawing, the protective closure 10 for the water pipe 12 incorporates a closed-cell foam plastic plug 14 at one end, and a cap 16 at an opposite end of a diameter 18 greater than the diameter 20 of the plug 14. Such plug 14 is preferably composed of a closed-cell polyethylene foam, as is the cap 16—although in an alternative construction, the cap 16 may be instead composed of a hard sheet plastic. In either construction, the plug 14 is selected of a first density, for resilience and flexibility, in allowing the plug 14 to be squished, squashed, or otherwise inserted into the water pipe 12 even though the diameter 20 of the plug may be greater than the inside diameter 22 of the pipe 12. As will be understood from FIG. 5, the diameter 18 of the cap 16 is selected to allow the closure 10 to seat wholly within the pipe 12 at its bell end 48 and to close off the pipe 12 at its spigot end 50.

As will be readily apparent, the protective closure of this construction thus makes the water pipe 12 both water tight and dirt proof with the closure inserted at both ends 48 and 50, to protect it against rats, rodents, mud and other types of debris while the pipe is in storage, awaiting delivery to the construction site—and further, while the pipe is laying along the road, awaiting installation. In a typical manufacture, the cap 16 is selected of a thickness 26 less than the thickness 28 of the plug 14—and preferably several times less, for simplicity of manufacture and reduction of cost—for example, ½ inch as compared to 2 inch. With the cap 16 constructed of a higher density, there is a limiting to any inadvertent forcing of the closure 10 further into the pipe 12 at its bell end 48 or into the pipe 12 at its spigot end 50.

Figure 2A:
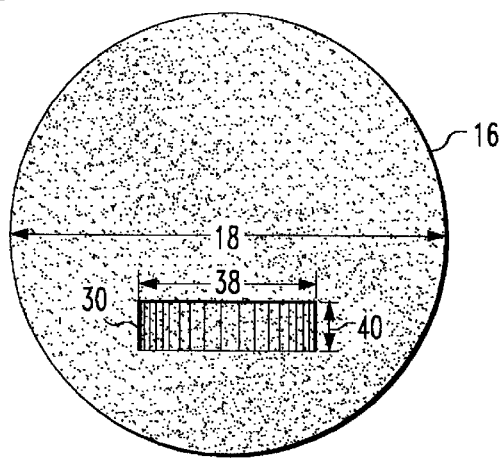
FIGS. 2a and 2b are top and side views of the protective closure of FIG. 1.
Figure 2B:
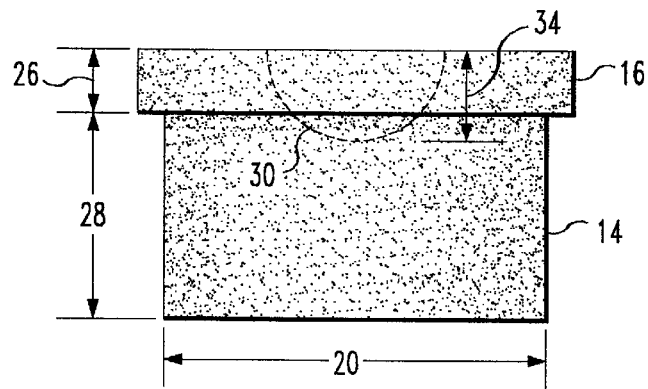

FIGS. 1, 2a and 2b also illustrate a preferable manner, cooperating with the cap 16, for pulling the plug 14 from the water pipe 12 when the pipe is to be installed. Shown by the reference numeral 30, a scooped-out handle is provided in the cap 16, offset and spaced apart from its center 32, and preferably scooped to a depth 34 greater than the thickness 26 of the cap 16 to extend into the plug 14, as with a depth 1 inch as contrasted with the thickness 26 of ½ inch. The offset, scooped-out handle 30 will be understood to allow a grasping by a worker, a movement of the closure back and forth to eventually loosen, and free, the closure from the friction with the inside diameter 22 of the pipe 12 and its subsequent, easy removal. In one construction of the closure 10 for an 8 inch ductile iron pipe, the scooped-out handle 30 may be of a length 38 of some 2½ inches and a width 40 of some ¾ inches.

Figure 3:
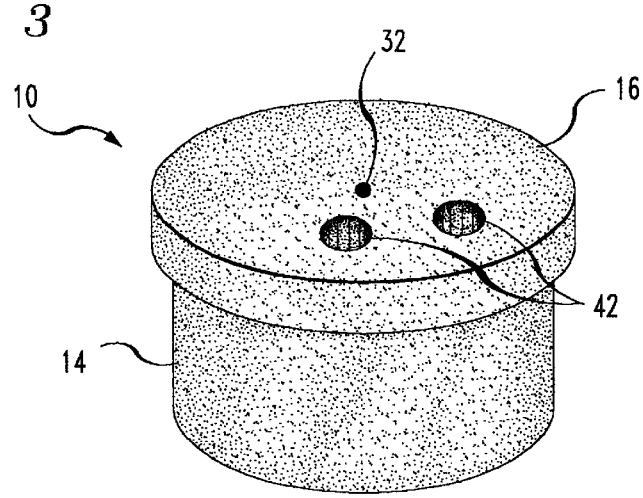
FIGS. 3 and 4 are perspective views of alternative protective closures embodying the invention.
Figure 4:
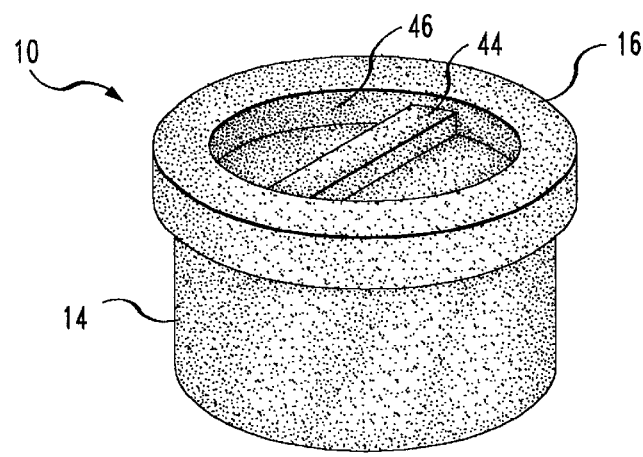

FIGS. 3 and 4 show alternative means to cooperate with the cap 16 to free the closure 10 from the friction of the inner diameter 22 of the pipe 12 in allowing for its easy removal. In FIG. 3, a pair of finger-holes 42 are shown, still offset from the center 32 of the cap 16, and of a diameter of 1 inch, spaced apart a like 1 inch amount. In FIG. 4, on the other hand, an offset handle 44 is shown, within a groove 46 cut into the cap 16.

Figure 5:
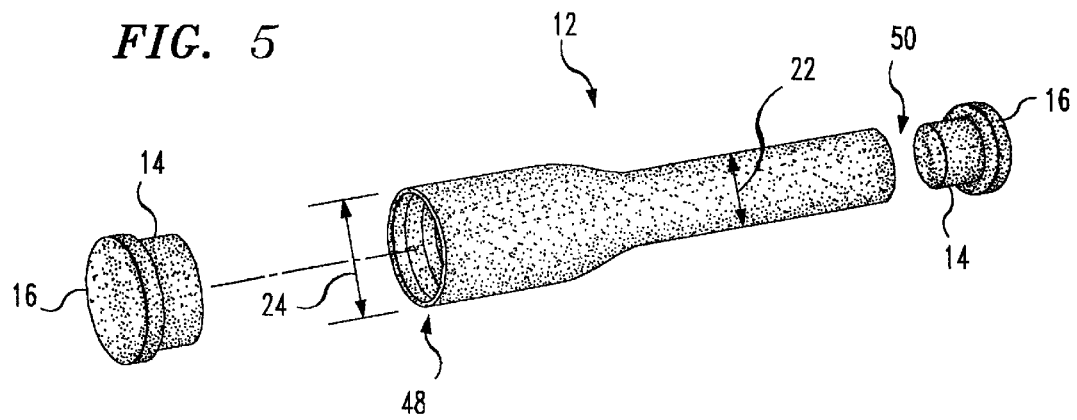
FIG. 5 illustrates how the protective closure of FIG. 1 is inserted into, and removed from, both the bell and spigot ends of a ductile iron water pipe, for example.

Thus, in FIG. 5, grasping the scooped-out handle 30, the finger-holes 42, or the offset handle 44—whichever the situation—will enable a rocking or shifting movement of the closures inserted at the ends 48 and 50, to release them from the pipe 12 once inserted. With the closed-cell foam plastic of dual densities for the plug 14 and the cap 16—or with the hard sheet plastic cap in an alternative construction—, the protective closure of the invention will be seen to expand along with the pipe 12 as temperatures increase, and to contract with the pipe 12 when temperatures fall. In such manner, the closure of the invention will be noted to continue to be both moisture and debris resistant to protect the pipe under all conditions in storage, in transport, and when dumped to lie on the ground at the road, awaiting ultimate installation at the construction site, whichever end of the pipe the closure may be inserted at.

While there have been described what are considered to be preferred embodiments of the present invention, it will be readily appreciated that modifications can be made by those skilled in the art without departing from the teachings herein, of having a closure utilizing a first density foam plastic plug to be squeezed into a water pipe of smaller inside diameter—and to be held in place there by friction—and a higher density plastic cap, both to limit further insertion and as a means of grasping the closure to be removed when desired. For at least such reason, therefore, resort should be had to the claims appended hereto for a true A understanding of the scope of the invention.

I claim:

1. A protective closure for closing off a water pipe for shipping and storage, and prior to its installations in a water distribution system comprising:
    a first end, having a diameter greater than the inside diameter of said water pipe, and consisting of a closed-cell foam plastic plug of a density exhibiting resilience and flexibility for press-fitting said plug into said pipe and to be held there by friction in maintaining said pipe water tight and dirt proof;
    an opposite end, having a diameter greater than the diameter of said plug, and consisting of a cap of higher density plastic to limit the extent of insertion of said plug into said pipe while aiding its subsequent removal therefrom;
    and means cooperating with said cap for pulling said plug from said pipe when said pipe is ready for installation in said water distribution system.

2. The protective closure of claim 1 wherein said cap is of a first thickness, said plug is of a second thickness, and said second thickness is greater than said first thickness.

3. The protective closure of claim 2 wherein said thickness of said plug is several times greater than said thickness of said cap.

4. The protective closure of claim 1 wherein said plug is composed of a closed-cell polyethylene foam.

5. The protective closure of claim 4 wherein said cap is also composed of a closed-cell polyethylene foam.

6. The protective closure of claim 4 wherein said cap is composed of a hard sheet plastic.

7. The protective closure of claim 1 wherein said cap is composed of a closed-cell polyethylene foam.

8. The protective closure of claim 1 wherein said cap is composed of a hard sheet plastic.

9. The protective closure of claim 1 wherein said means extends through said cap and into said plug.

10. The protective closure of claim 9 wherein said cap includes a center, and wherein said means is spaced apart therefrom.

11. The protective closure of claim 1 wherein said means includes a scooped-out handle formed in said cap.

12. The protective closure of claim 1 wherein said means includes a plurality of finger-holes formed in said cap.

13. The protective closure of claim 1 for use with a water pipe having a bell end and a spigot end, wherein said cap has a diameter for seating said closure wholly within said pipe when inserted at its said bell end and for closing off said pipe when inserted at its said spigot end.

14. The combination comprising:
    a water pipe having a bell end and a spigot end; and
    a protective closure for closing off said water pipe for shipping and storage, and prior to its installation in a water distribution system;
    said protective closure including a first end having a diameter greater than the inside diameter of said water pipe, and consisting of a closed-cell foam plastic plug of a density exhibiting resilience and flexibility for press-fitting said plug into said pipe and to be held there by friction in maintaining said pipe water tight and dirt proof, also including an opposite end having a diameter greater than the diameter of said plug, and consisting of a cap of higher density plastic to limit the extent of insertion of said plug into said pipe while aiding in its subsequent removal therefrom, and further including means cooperating with said cap for pulling said plug from said pipe when said pipe is ready for installation in said water distribution system.

15. The combination of claim 14 wherein said protective closure includes a first end of a diameter to seat wholly within said bell end of said pipe.

16. The combination of claim 14 wherein said protective closure includes a first end of a diameter to close off said spigot end of said pipe.

17. The combination comprising:
    a water pipe having a bell end and a spigot end;
    first and second protective closures for closing off said water pipe for shipping and storage, and prior to its installation in a water distribution system;
    said first protective closure including a first end having a diameter greater than the inside diameter of said bell end of said water pipe, and consisting of a first closed-cell foam plastic plug of a density exhibiting resilience and flexibility for press-fitting said plug into said bell end of said pipe and to be held there by friction in maintaining said bell end of said pipe water tight and dirt proof;
    said first protective closure also including an opposite end having a diameter greater than the diameter of said first plug, and consisting of a first cap of higher density plastic to limit the extent of insertion of said first plug into said bell end of said pipe while aiding in its subsequent removal therefrom, and further including means cooperating with said first cap for pulling said first plug from said bell end of said pipe when said pipe is ready for installation in said water distribution system; and wherein said second protective closure includes a first end having a diameter greater than the inside diameter of said spigot end of said water pipe, and consisting of a second closed-cell foam plastic plug of a density exhibiting resilience and flexibility for press-fitting said second plug into said spigot end of said pipe and to be held there by friction in maintaining said spigot end of said pipe water tight and dirt proof;

said second protective closure also including an opposite end having a diameter greater than the diameter of said second plug, and consisting of a second cap of higher density plastic to limit the extent of insertion of said second plug into said spigot end of said pipe while aiding in its subsequent removal therefrom, and further including means cooperating with said second cap for pulling said second plug from said spigot end of said pipe when said pipe is ready for installation in said water distribution system.

* * * * *